(12) United States Patent
Zhang et al.

(10) Patent No.: US 12,267,697 B2
(45) Date of Patent: Apr. 1, 2025

(54) QCL CONFIGURATION AND DCI INDICATION FOR UNIFIED FRAMEWORK

(71) Applicant: Apple Inc., Cupertino, CA (US)

(72) Inventors: Yushu Zhang, Beijing (CN); Chunxuan Ye, Cuertino, CA (US); Dawei Zhang, Cupertino, CA (US); Haitong Sun, Cupertino, CA (US); Hong He, Cupertino, CA (US); Huaning Niu, Cupertino, CA (US); Wei Zeng, Cupertino, CA (US); Weidong Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,078

(22) PCT Filed: Jan. 15, 2021

(86) PCT No.: PCT/CN2021/072060
§ 371 (c)(1),
(2) Date: Sep. 24, 2021

(87) PCT Pub. No.: WO2022/151324
PCT Pub. Date: Jul. 21, 2022

(65) Prior Publication Data
US 2023/0344607 A1    Oct. 26, 2023

(51) Int. Cl.
*H04W 24/02*    (2009.01)
*H04W 72/23*    (2023.01)
*H04L 5/00*    (2006.01)

(52) U.S. Cl.
CPC ........... *H04W 24/02* (2013.01); *H04W 72/23* (2023.01); *H04L 5/001* (2013.01); *H04L 5/0053* (2013.01); *H04L 5/0091* (2013.01)

(58) Field of Classification Search
CPC .............................. H04W 72/23; H04W 24/02
See application file for complete search history.

(56) References Cited

U.S. PATENT DOCUMENTS

| | | |
|---|---|---|
| 2019/0260532 A1 | 8/2019 | Manolakos et al. |
| 2020/0127723 A1 | 4/2020 | Kang et al. |
| 2021/0391899 A1* | 12/2021 | Cao ........... H04B 17/373 |
| 2022/0159479 A1 | 5/2022 | Si et al. |

(Continued)

FOREIGN PATENT DOCUMENTS

| | | |
|---|---|---|
| CN | 110959268 A | 4/2020 |
| CN | 111835482 A | 10/2020 |
| WO | 2019/182806 A1 | 9/2019 |

(Continued)

OTHER PUBLICATIONS

International Preliminary Report on Patentability received for PCT Patent Application No. PCT/CN2021/072060, mailed on Jul. 27, 2023, 5 pages.

(Continued)

*Primary Examiner* — Kevin C. Harper
(74) *Attorney, Agent, or Firm* — Kubota & Basol LLP

(57) ABSTRACT

A message can be communicated from a base station to a user equipment (UE) device. In the message, a unified TCI state can be provided. The TCI state can support two QCL types, wherein the QCL types are based on QCL-TypeA and QCL-TypeD. Other aspects are described.

18 Claims, 9 Drawing Sheets

(56) References Cited

U.S. PATENT DOCUMENTS

2023/0141660 A1* 5/2023 Matsumura ........... H04W 16/28
370/329
2023/0188308 A1* 6/2023 Karjalainen ......... H04B 7/0408
370/336

FOREIGN PATENT DOCUMENTS

WO 2019/233334 A1 12/2019
WO 2020/240633 A1 12/2020
WO 2021/118858 A1 6/2021

OTHER PUBLICATIONS

International Search Report and Written Opinion received for PCT Patent Application No. PCT/CN2021/072060, mailed on Oct. 12, 2021, 6 pages.
ZTE, "Remaining details on QCL", 3GPP TSG RAN WG1 Meeting #92, R1-1801590, Feb. 26-Mar. 2, 2018, 5 pages.
ZTE, "Remaining issues on QCL", 3GPP TSG RAN WG1 Meeting #93, R1-1805836, May 21-25, 2018, 7 pages.
Supplementary European Search Report and Search Opinion received for European Application No. 21918532.9, mailed on Jan. 30, 2024, 13 pages.

* cited by examiner

```
TCI-State ::=           SEQUENCE {
  tci-StateId           TCI-StateId,
  qcl-Type1             QCL-Info,
  qcl-Type2             QCL-Info    OPTIONAL,  -- Need R
  ...
}

QCL-Info ::=            SEQUENCE {
  cell                  ServCellIndex OPTIONAL,  -- Need R
  bwp-Id                BWP-Id    OPTIONAL,  -- Cond CSI-RS-Indicated
  referenceSignal          CHOICE {
    csi-rs              NZP-CSI-RS-ResourceId,
    ssb                 SSB-Index
  },
  qcl-Type              ENUMERATED {typeA, typeB, typeC, typeD},
  ...
}
```

FIG. 7

QCL CONFIGURATION AND DCI INDICATION FOR UNIFIED FRAMEWORK

RELATED APPLICATIONS

The present application is the national phase of International Application No. PCT/CN2021/072060, filed on Jan. 15, 2021 and the disclosure of which is hereby incorporated herein by reference in its entirety.

FIELD OF INVENTION

This invention relates generally to wireless technology and more particularly to quasi-co-location (QCL) and downlink control information (DCI) for a unified framework.

BACKGROUND OF THE INVENTION

Fifth generation mobile network (5G) is a wireless standard that aims to improve upon data transmission speed, reliability, availability, and more. This standard, while still developing, includes numerous details relating to various aspects of wireless communication, for example, NR and NR in the unlicensed spectrum (greater than 52.6 GHz), also known as NR-U.

SUMMARY OF THE DESCRIPTION

Aspects of the present disclosure relate to 5G new radio (NR) operating in the licensed band or in the unlicensed band (NR-U). 5G NR-U operates above the 52.6 GHz band.

In some aspects, a unified TCI State can support up to 2 QCL Types. These types can be QCL-TypeA and QCL-TypeD, or new QCL types based on those types.

In some aspects, a unified TCI state can support up to 3 QCL Types. These types can be QCL-TypeA, QCL-TypeC, QCL-TypeD, or new QCL types based on those types.

In some aspects, a unified TCI state can support up to 3 QCL Types. These types can be QCL-TypeA, QCL-TypeB, QCL-TypeC, or new QCL types based on those types.

In some aspects, a MAC control element (CE) can configure multiple Transmission Configuration Index (TCI) States for different channels for a TCI code-point in DCI.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 7 shows QCL restrictions, according to some aspects.

DETAILED DESCRIPTION

Figure 1:
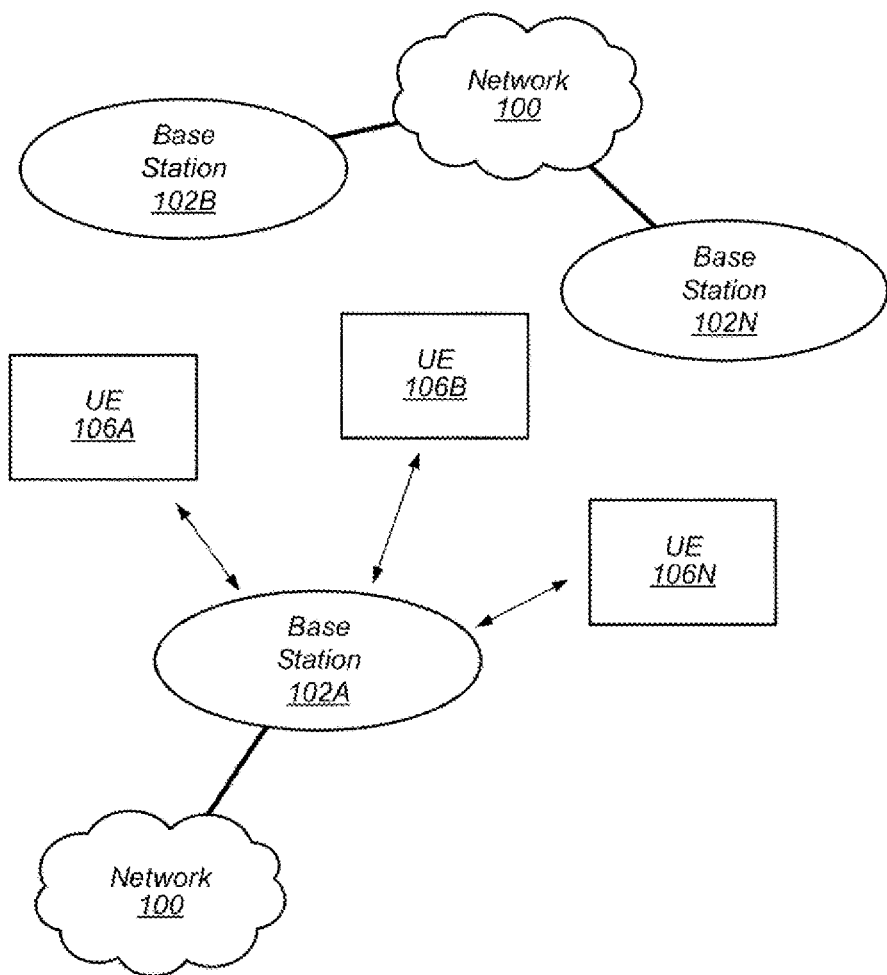
FIG. 1 illustrates an example wireless communication system according to some aspects.

A method and apparatus of a device that determines a physical downlink shared channel scheduling resource for a user equipment device and a base station is described. In the following description, numerous specific details are set forth to provide thorough explanation of aspects of the present invention. It will be apparent, however, to one skilled in the art, that aspects of the present invention may be practiced without these specific details. In other instances, well-known components, structures, and techniques have not been shown in detail in order not to obscure the understanding of this description.

Reference in the specification to "some aspects" or "an aspect" means that a particular feature, structure, or characteristic described in connection with the aspect can be included in at least one aspect of the invention. The appearances of the phrase "in some aspects" in various places in the specification do not necessarily all refer to the same aspect.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a physical downlink shared channel scheduling resource for a user equipment device and a base station is described. In some aspects, the device is a user equipment device that has a wireless link with a base station. In some aspects, the wireless link is a fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

The frequency bands for 5G networks come in two sets—frequency range 1 (FR1) and frequency range 2 (FR2). FR1 covers communications from 450 MHz to 6 GHz, which includes the LTE frequency range. FR2 covers 24.25 GHz to 52.6 GHz. FR2 is known as the millimeter wave (mmWave) spectrum. In some aspects, the UE and base station can communicate over NR in the unlicensed band which is above FR2, also known as NR-U.

NR-U is a mode of operation that defines technology for cellular operators to integrate the unlicensed spectrum (e.g., frequencies greater than 52.6 GHz, such as, for example, between 52.6 GHz and 71 GHz) into 5G networks. Radio waves in this band have wavelengths in the so-called millimeter band, and radiation in this band is known as millimeter waves. NR-U enables both uplink and downlink operation in unlicensed bands. NR-U supports new features, for example, wideband carriers, flexible numerologies, dynamic TDD, beamforming, and dynamic scheduling/HARQ timing.

In NR-U, license-assisted use as well as standalone use are supported in the unlicensed spectrum. Operators can use a non-standalone mode to aggregate the unlicensed bands with licensed 5G frequencies to bolster capacity (e.g., similar to LAA), as well as a standalone mode wherein an enterprise could use unlicensed spectrum to deploy a private cellular network. It should be understood that aspects described in the present disclosure with reference to NR can also apply to NR-U and vice versa unless context dictates otherwise.

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
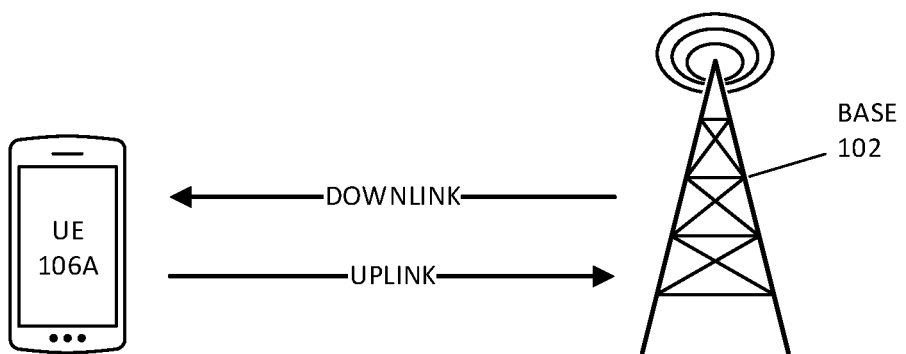
FIG. 2 illustrates uplink and downlink communications according to some aspects.

FIG. 2 illustrates UE 106A that can be in communication with a base station 102 through uplink and downlink communications, according to some aspects. The UEs may each be a device with cellular communication capability such as a mobile phone, a hand-held device, a computer or a tablet, or virtually any type of wireless device.

The UE may include a processor that is configured to execute program instructions stored in memory. The UE may perform any of the method aspects described herein by executing such stored instructions. Alternatively, or in addition, the UE may include a programmable hardware element such as an FPGA (field-programmable gate array) that is configured to perform any of the method aspects described herein, or any portion of any of the method aspects described herein.

The UE may include one or more antennas for communicating using one or more wireless communication protocols or technologies. In some aspects, the UE may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE may include separate transmit and/or receive chains (e.g., including separate antennas and other radio components) for each wireless communication protocol with which it is configured to communicate. As a further possibility, the UE may include one or more radios which are shared between multiple wireless communication protocols, and one or more radios which are used exclusively by a single wireless communication protocol. For example, the UE might include a shared radio for communicating using either of LTE or 5G NR (or LTE or 1×RTT or LTE or GSM), and separate radios for communicating using each of Wi-Fi and Bluetooth. Other configurations are also possible.

Figure 3:
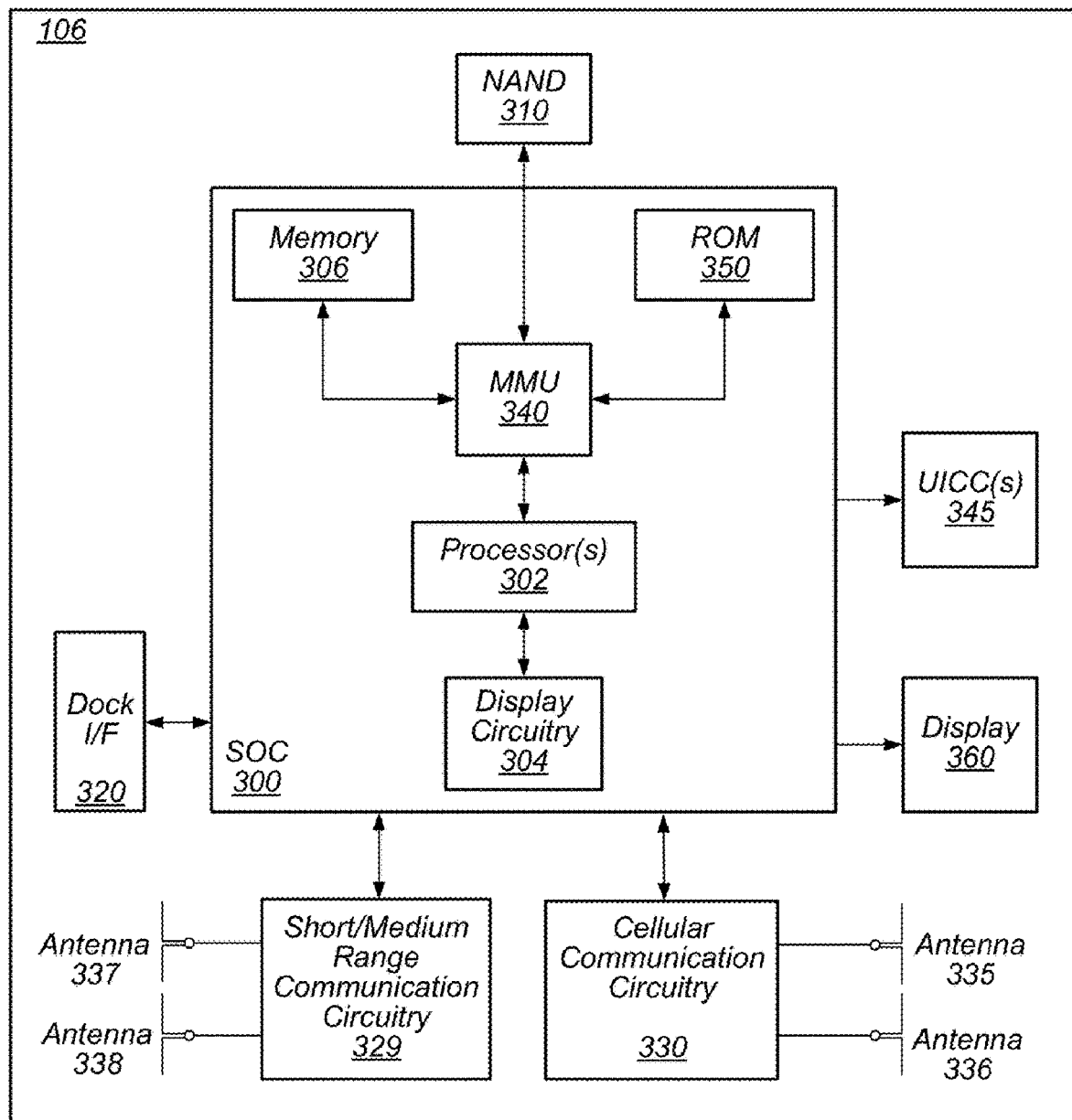
FIG. 3 illustrates an example block diagram of a UE according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively; directly or indirectly, dedicated processors and/or radios) for multiple radio access technologies (RATs) (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
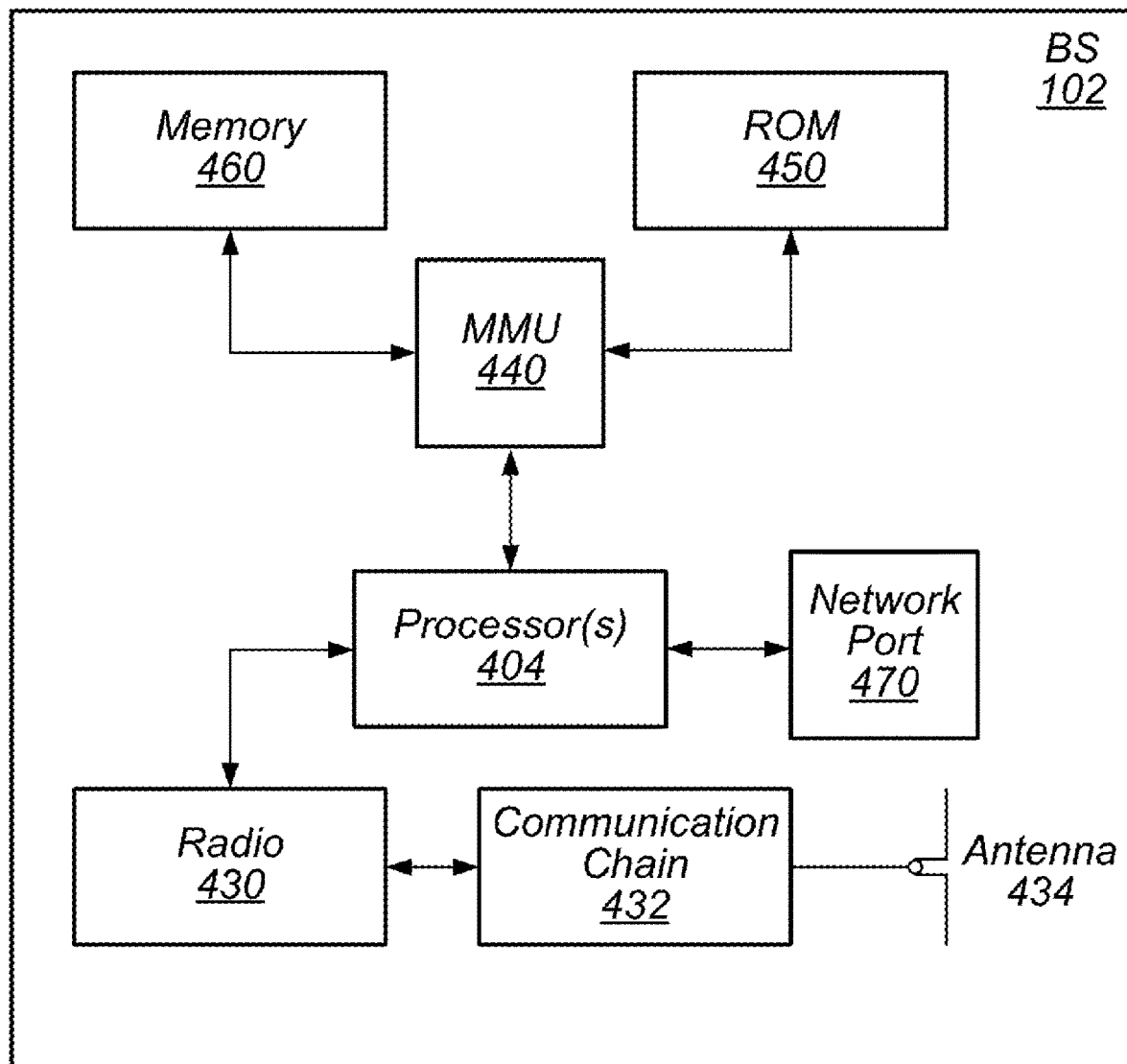
FIG. 4 illustrates an example block diagram of a BS according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs. In some aspects, the base station can operate in 5G NR-U mode.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, 5G NR-U, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR and 5G NR-U. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
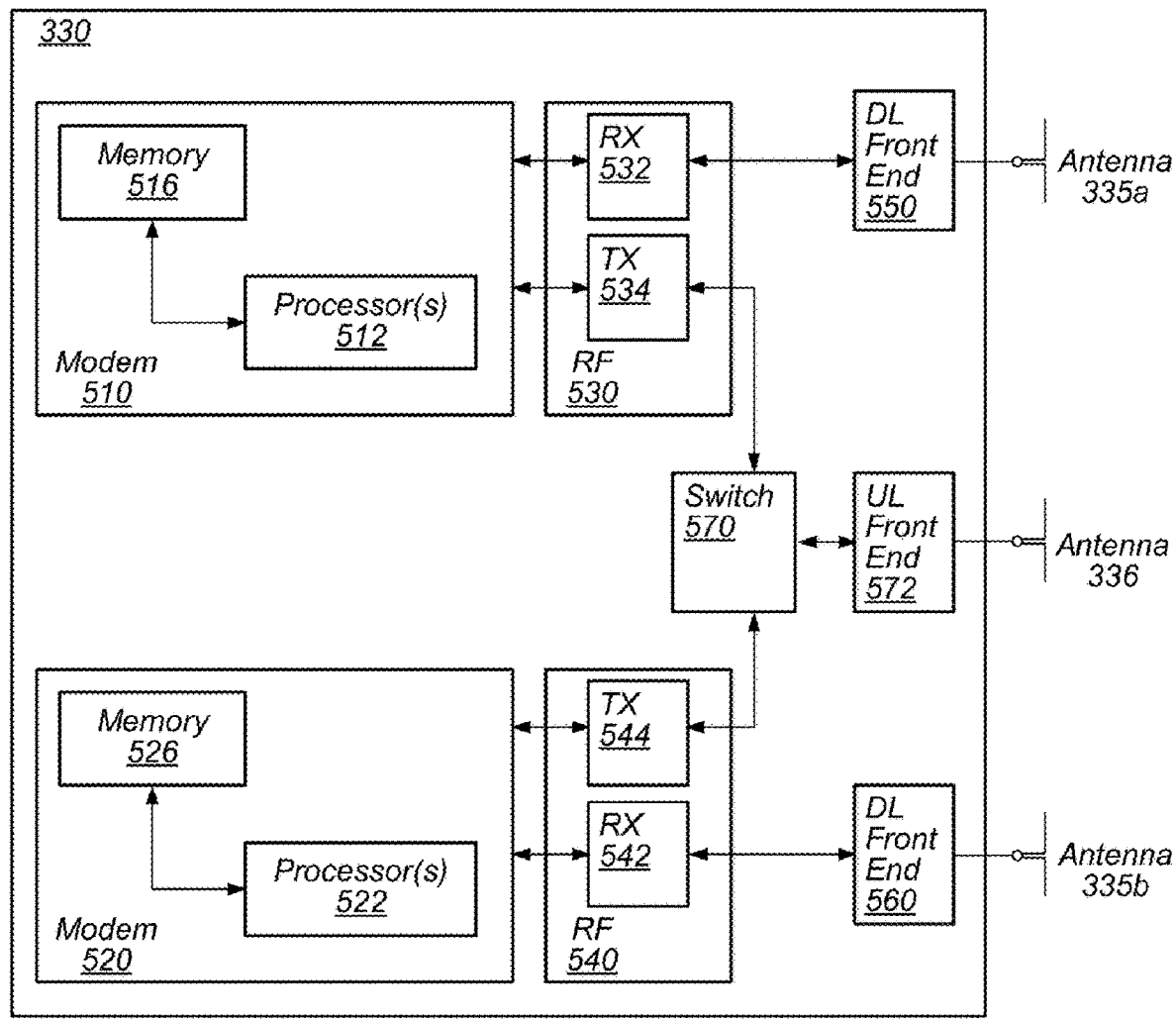
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some aspects, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

A downlink quasi-co-location (QCL) indication for downlink reference signals can be based on Transmission Configuration Indication (TCI). QCL types are defined as 'QCL-TypeA': {Doppler shift, Doppler spread, average delay, delay spread}, 'QCL-TypeB': {Doppler shift, Doppler spread}, 'QCL-TypeC': {Doppler shift, average delay}, and 'QCL-TypeD': {Spatial Rx parameter}.

Figure 6:
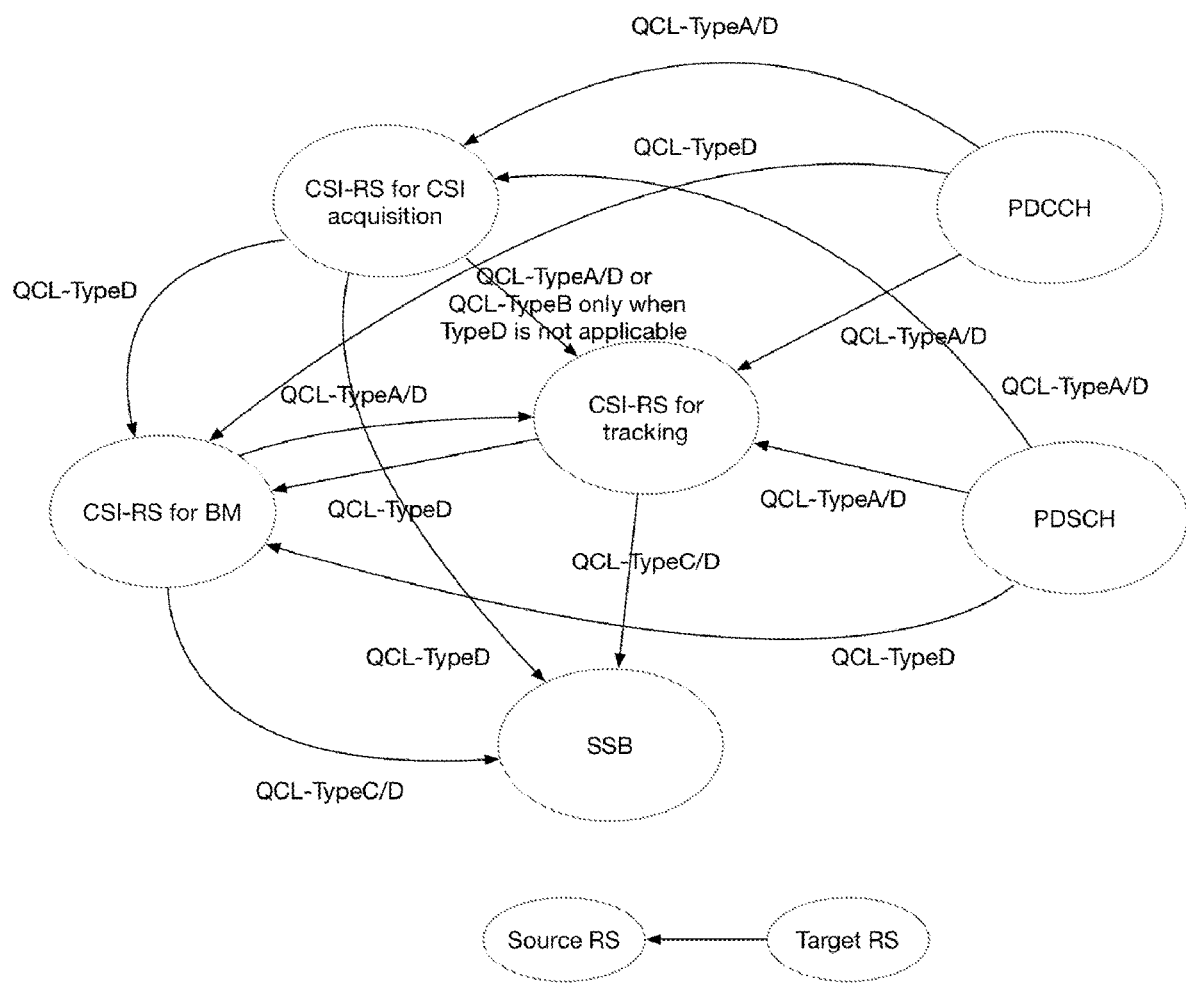
FIG. 6 shows an example TCI state configuration, according to some aspects.

The QCL information can assist UE beam tracking (QCL-TypeD), time/frequency offset tracking (QCL-TypeA/B/C), as well as demodulation. In a TCI State, up to 2 QCL-types can be configured, for example, as shown in FIG. 6. Some restrictions for QCL types indications are defined as illustrated in the FIG. 7.

CSI-RS for CSI acquisition indicates CSI-RS in a resource set configured without repetition and without TRS-info, which is used for CSI calculation. CSI-RS for BM indicates CSI-RS in a resource set configured with repetition, which is used for L1-RSRP/L1-SINR calculation. CSI-RS for tracking (TRS) indicates CSI-RS in a resource set configured with TRS-info, which is used for time/frequency offset tracking. In the FIG. 7, "/" denotes "and/or".

The unified TCI indication is going to be supported, where one TCI can be indicated to update the QCL for several downlink channels, e.g. PDCCH and PDSCH, or both downlink and uplink channels.

gNB can use MAC CE to activate multiple TCI States, and use DCI to indicate the TCI State from the TCI States selected by MAC CE. The action delay for the MAC CE could be N, e.g. N=3 ms after UE sends the ACK for the MAC CE. The action delay for TCI in the DCI could be: Option 1: M ms after the DCI; Option 2: M ms after UE sends the acknowledgement information for the DCI where M is a predefined amount of time.

The indicated TCI index in DCI can be applied to a group of CCs within a band or band group.

Problems arise with unified TCI framework.

Issue #1: What kind of source reference signals and corresponding QCL type indication can be configured in the unified TCI State? How to apply the indicated QCL types and source reference signals in unified TCI State for multiple channels, e.g. PDCCH, PDSCH, and different types of CSI-RS?

To address the issue, three options are described below.

Option 1: The unified TCI State can still provide up to 2 QCL Types, which should be based on QCL-TypeA and QCL-TypeD. Option 1-1: The source reference signal can be TRS for both QCL-TypeA and QCL-TypeD. Option 1-2: The source reference signal can be TRS for QCL-TypeA and CSI-RS for BM for QCL-TypeD. Option 1-3: The source reference signal can be CSI-RS for CSI acquisition for both QCL-TypeA and QCL-TypeD. The indicated unified TCI State can be applied for PDCCH (CORESETs) and PDSCH only.

Alternatively, the indicated unified TCI State can be applied for CSI-RS for CSI acquisition and/or CSI-RS for BM in addition to PDCCH/PDSCH. As a further extension, this may not be applicable for periodic CSI-RS. If CSI-RS for CSI acquisition is included, only option 1-1 and option 1-2 can be valid. If CSI-RS for BM is included, only option 1-1 and option 1-3 can be valid.

Option 2: The unified TCI State can provide up to 3 QCL Types, which should be based on QCL-TypeA and QCL-TypeC and QCL-TypeD. Option 2-1: The source reference signal can be TRS for both QCL-TypeA and QCL-TypeD, and SSB for QCL-TypeC. Option 2-2: The source reference signal can be TRS for QCL-TypeA, CSI-RS for BM for QCL-TypeD, and SSB for QCL-TypeC. Option 2-3: The source reference signal can be TRS for QCL-TypeA, and SSB for both QCL-TypeC and QCL-TypeD. Option 2-4: The source reference signal can be CSI-RS for CSI acquisition for both QCL-TypeA and QCL-TypeD, and SSB for QCL-TypeC.

The indicated unified TCI State can be applied for PDCCH (CORESETs), PDSCH and TRS/CSI-RS for BM. QCL-TypeC is only applied for TRS/CSI-RS for BM.

Alternatively, the indicated unified TCI State can be applied for CSI-RS for CSI acquisition. Option 2-4 may be invalid for this case.

As a further extension, option 2 may not be applicable for periodic CSI-RS.

Option 3: The unified TCI State can provide up to 3 QCL Types, which should be based on QCL-TypeA and QCL-TypeB and QCL-TypeC. The source reference signal can be TRS for both QCL-TypeA and QCL-TypeB, and SSB for QCL-TypeC. The indicated unified TCI State can be applied for PDCCH (CORESETs), PDSCH, CSI-RS for CSI acquisition and TRS/CSI-RS for BM. QCL-TypeC is only applied for TRS/CSI-RS for BM. QCL-TypeB is only applied for CSI-RS for CSI acquisition. As a further extension, Option 3 may not be applicable for periodic CSI-RS.

Option 4: The MAC CE can configure multiple TCI States for different channels for a TCI code-point in DCI. In one example, one TCI is provided for PDCCH+PDSCH beam indication as option 1. Optionally, a second TCI is provided for TRS beam indication based on the QCL types defined in Figure in FIG. 7. Optionally, a third TCI is provided for CSI-RS for CSI acquisition beam indication based on the QCL types defined in FIG. 7. Optionally, a forth TCI is provided for CSI-RS for BM beam indication based on the QCL types defined in FIG. 7.

For joint UL/DL beam indication, the source RS for QCL-typeD indication in TCI applied for PDCCH/PDSCH can be applied for uplink beam indication for PUCCH/PUSCH/SRS for Codebook/non-codebook/antenna switching. Different TCI code-points can be mapped to different TCI States combinations.

Figure 8:
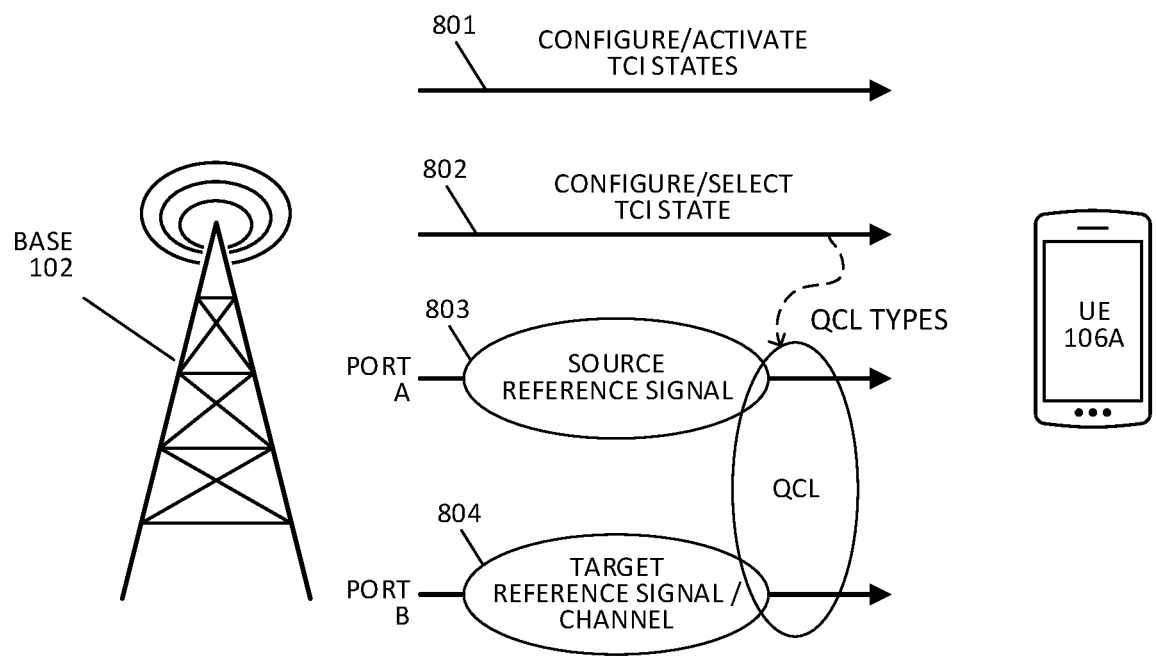
FIG. 8 shows communication of MAC CE, according to some aspects.

Issue #2: How to interpret the indicated TCI in DCI if the action time for MAC CE for TCI indication is in between the DCI and the action delay of the DCI, as shown in FIG. 8?

Whether the latest MAC CE before the action time should be considered or the latest MAC CE before the DCI should be considered. The following options are provided to define indication of the TCI in DCI if the action time for MAC CE for TCI indication is in between the DCI and the action delay of the DCI.

Option 1: The indicated TCI in DCI is based on the latest MAC CE before the action time of the DCI.

Option 2: The indicated TCI in DCI is based on the latest MAC CE before the DCI

Option 3: Whether to use option 1 or option 2 is configured by higher layer signaling, RRC or MAC CE.

Option 4: Whether to use option 1 or option 2 is reported by UE capability.

Figure 9:
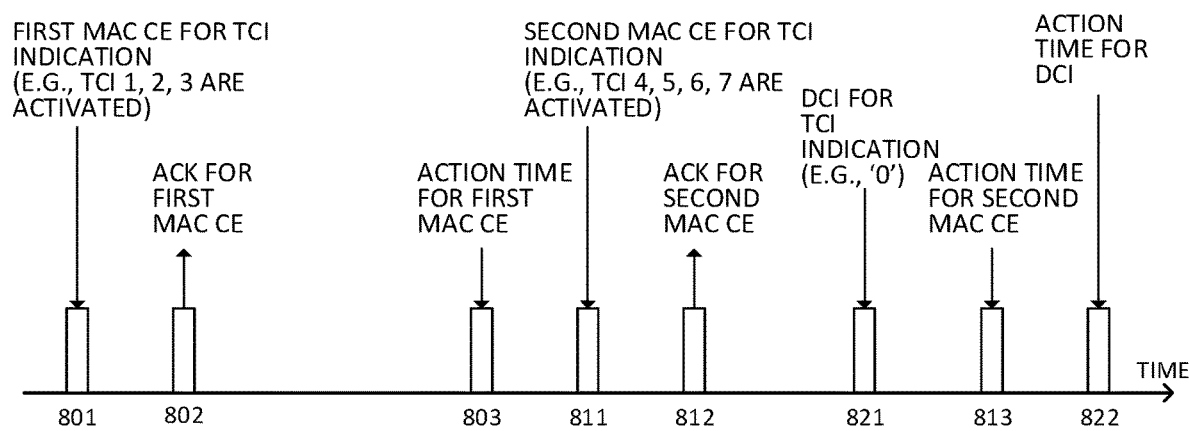
FIG. 9 shows communication with DCI, according to some aspects.
Figure 10:
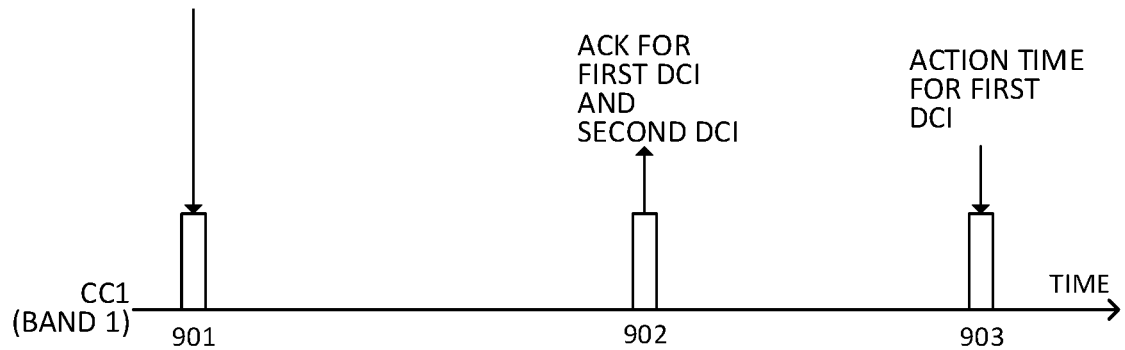
FIG. 10 shows communication with MAC CE and DCI, according to some aspects.
Figure 10:

Issue #3: Since the indicated TCI can be applied to multiple CCs, if there are multiple TCI indication from PDCCH in multiple DCIs in the same or different CCs with the same action time, how to interpret the indicated TCI States? Such an issue is illustrated in FIG. 9. The following options are provided for TCI indication for multi-CC case.

Option 1: Only 1 CC within a band or band group is used for unified TCI indication. Option 1-1: The CC index may be configured by higher layer signaling, e.g. RRC or MAC CE. Option 1-2: The CC index may be predefined, e.g. CC with lowest ID or highest ID.

For CCs that cannot be used for unified TCI indication, the TCIPresentInDCI for each CORESET may be configured as disabled.

Option 2: When DCIs with TCI indication are transmitted by multiple CCs within a band or band group, which are with the same action time, UE follows a priority rule to determine the TCI for each CC, and the priority may be defined by CC index; CORESET/SS ID. In one example, the CC with lower ID can be with higher priority and within a CC, the lower CORESET/SS ID can lead to higher priority.

Option 3: One TCI code-point in DCI could indicate "no beam update". "No beam update" indicates UE can use current beam. UE should not expect more than 1 PDCCHs with TCI indication to update beam at the same action time. Alternatively, UE should not expect more than 1 PDCCHs with TCI indication to update beam for the same channel at the same action time.

As a further extension, for multi-DCI based multi-TRP operation, the PDCCH in a CORESET with a CORESET-PoolIndex can be used to update the signals corresponding to the same CORESETPoolIndex.

For PDCCH, the associated CORESETPoolIndex is configured in each CORESET. For PDSCH/aperiodic CSI-RS, the associated CORESETPoolIndex is determined by the CORESET with scheduling PDCCH. For periodic/semi-persistent CSI-RS, the associated CORESETPoolIndex may be configured by higher layer signaling, e.g. RRC or MAC CE. Options 1-3 may be performed per CORESETPoolIndex.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

A baseband processor (also known as baseband radio processor, BP, or BBP) is a device (a chip or part of a chip) in a network interface that manages radio functions, such as communicating (e.g., TX and RX) over an antenna.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary aspects of the present invention. One skilled in the art will readily recognize from such discussion, the accompanying drawings and the claims that various modifications can be made without departing from the spirit and scope of the invention.

What is claimed is:

1. A baseband processor of a user equipment (UE) configured to perform operations comprising:

receiving configuration of a transmission configuration indication (TCI) state that is applicable for a plurality of communication channels within a band, the received TCI state configuring a quasi co-location (QCL) typeA and a QCL typeD with a tracking reference signal (TRS) as a source reference signal (SRS) for the QCL typeA and the QCL typeD;

receiving a downlink control information (DCI) that indicates to activate the TCI state that is applicable for the plurality of communication channels within the band, wherein a first media access control control element (MAC CE) is received that activates a first set of TCI state, a second MAC CE is received that activates a second set of TCI states, and in response to an action time of the DCI occurring after the second MAC CE becomes active, the UE selects the TCI state that is indicated in the DCI from the second set of TCI states, and in response to the action time of the DCI not occurring after the second MAC CE becomes active, the UE selects the TCI state from the first set of TCI states;

determining channel properties of one or more of the communication channels based on QCL type indicators of the TCI state; and decoding a message of the one or more communication channels based on the channel properties.

2. The baseband processor of claim 1, wherein the channel properties comprises a delay spread associated with the communication channels.

3. The baseband processor of claim 1, wherein the channel properties comprise a doppler spread associated with the communication channels.

4. The baseband processor of claim 1, wherein the channel properties comprise an average delay associated with the communication channels.

5. The baseband processor of claim 1, wherein TCI state configures a physical downlink control channel (PDCCH) and a physical downlink sidelink channel (PDSCH).

6. The baseband processor of claim 1, wherein the channel properties comprises a spatial receiver parameter associated with the communication channels.

7. A method, performed by a user equipment (UE), comprising:

receiving configuration of a transmission configuration indication (TCI) state that is applicable for a plurality of communication channels within a band, the TCI state configuring a quasi co-location (QCL) typeA and the QCL typeD with a tracking reference signal (TRS) as a source reference signal (SRS) for the QCL typeA and the QCL typed;

receiving a downlink control information (DCI) that indicates to activate the TCI state that is applicable for the plurality of communication channels within the band, wherein a first media access control control element (MAC CE) is received that activates a first set of TCI state, a second MAC CE is received that activates a second set of TCI states, and in response to an action time of the DCI occurring after the second MAC CE becomes active, the UE selects the TCI state that is indicated in the DCI from the second set of TCI states, and in response to the action time of the DCI not occurring after the second MAC CE becomes active, the UE selects the TCI state from the first set of TCI states;

determining channel properties of one or more of the communication channels based on QCL type indicators of the TCI states, wherein the UE is to decode a message of the one or more communication channels based on the channel properties.

8. The method of claim 7, the channel properties comprises a delay spread associated with the communication channels.

9. The method of claim 7, wherein the channel properties comprise a doppler spread associated with the communication channels.

10. The method of claim 7, wherein the channel properties comprise an average delay associated with the communication channels.

11. The method of claim 7, wherein the TCI state configures a physical downlink control channel (PDCCH) and a physical downlink sidelink channel (PDSCH).

12. The method of claim 7, wherein the channel properties comprises a spatial receiver parameter associated with the communication channels.

13. A baseband processor of a base station configured to perform operations:

transmitting, to a user equipment (UE), a configuration of a transmission configuration indication (TCI) state that is applicable for a plurality of communication channels within a band, the received TCI state configuring a quasi co-location (QCL) typeA and a QCL typeD with a tracking reference signal (TRS) as a source reference signal (SRS) for the QCL typeA and the QCL typeD;

transmitting a downlink control information (DCI) to the UE which activates the TCI state that is applicable for the plurality of communication channels within the band, wherein a first media access control control element (MAC CE) is transmitted to the UE that activates a first set of TCI state, a second MAC CE is transmitted to the UE that activates a second set of TCI states, and in response to an action time of the DCI occurring after the second MAC CE becomes active, the UE selects the TCI state that is indicated in the DCI from the second set of TCI states, and in response to the action time of the DCI not occurring after the second MAC CE becomes active, the UE selects the TCI state from the first set of TCI states;

transmitting one or more reference signals from which channel properties of one or more of the communication channels are determined by the UE based on QCL type indicators of the TCI state, wherein the base station is to transmit a message through the one or more communication channels that is decoded based on the channel properties.

14. The baseband processor of claim 13, wherein the channel properties comprises a delay spread associated with the communication channels.

15. The baseband processor of claim 13, wherein the channel properties comprise a doppler spread associated with the communication channels.

16. The baseband processor of claim 13, wherein the channel properties comprise an average delay associated with the communication channels.

17. The baseband processor of claim 13, wherein the TCI state configures a physical downlink control channel (PDCCH) and a physical downlink sidelink channel (PDSCH).

18. The baseband processor of claim 13, wherein the channel properties comprises a spatial receiver parameter associated with the communication channels.

* * * * *